United States Patent [19]

Ahland et al.

[11] Patent Number: 4,833,877
[45] Date of Patent: May 30, 1989

[54] PROCESS FOR THE REDUCTION OF POLLUTANT EMISSIONS FROM POWER STATIONS WITH COMBINED GAS/STEAM TURBINE PROCESSES WITH PRECEDING COAL GASIFICATION

[75] Inventors: Erwin Ahland, Essen; Franz Verfuss, Recklinghausen; Hans-Dieter Beyer; Joachim Lehmann, both of Essen, all of Fed. Rep. of Germany

[73] Assignee: Bergwerksverband GmbH, Essen, Fed. Rep. of Germany

[21] Appl. No.: 91,967

[22] Filed: Sep. 1, 1987

[30] Foreign Application Priority Data

Sep. 2, 1986 [DE] Fed. Rep. of Germany ....... 3629817

[51] Int. Cl.[4] .............................................. F02C 3/28
[52] U.S. Cl. ................................. 60/39.02; 60/39.12; 55/71
[58] Field of Search .............................. 55/71, 73, 97; 60/39.02, 39.12, 39.182, 39.5

[56] References Cited

U.S. PATENT DOCUMENTS

| | | | |
|---|---|---|---|
| 3,804,606 | 4/1974 | Archer et al. | 60/39.12 |
| 4,072,480 | 2/1978 | Wagner | 55/73 |
| 4,122,150 | 10/1978 | Hori et al. | 55/73 |
| 4,274,839 | 6/1981 | Leas | 55/71 |
| 4,316,813 | 2/1982 | Voss | 55/73 |
| 4,342,192 | 8/1982 | Heyn et al. | 60/39.182 |
| 4,450,777 | 5/1984 | Wolfrum et al. | 55/71 |
| 4,548,797 | 10/1985 | Sauer et al. | 55/73 |
| 4,569,197 | 2/1986 | Adrian et al. | 60/39.02 |

FOREIGN PATENT DOCUMENTS 2759751 12/1981 Fed. Rep. of Germany .
3137812 3/1983 Fed. Rep. of Germany .

OTHER PUBLICATIONS

Ekkehard Richter et al., "Adsorptionsverfahren zur Abscheidung von $SO_2$ und $NO_x$ aus Feuerungsabgasen", Gluckauf 121 (1985) Nr. 20, pp. 1561,1562,1565.
D. R. Plumley (Gas Turbine Division, General Elec. Co.) Schnectady, N.Y., "Cool Water Coal Gasification-A Progress Report", Transactions of the ASME, vol. 107, Oct. 85, pp. 856–860,
Thermische Verfahrenstechnik und Recktionstechnik 1–2/85, "Das Vew-Kohle-Umwandlungsverfahren", pp. 18, 21.
K. Reihnen et al., "Gas Cleaning at High Temperatures and High Pressures: a Review", Powder Technology, 40 (1984) 81–111, pp. 81–86.
G. F. Morrison, "Hot Gas Cleanup", IEA Coal Research, London, Mar. 1979, report number ICTIS/TR 03, pp. 1–5 & 16–34.
Hans Sommers et al., "Entfernung von Organischem Schwefel aud Koksofengas" Sonderdruch aus Erdol und Kohle-Erdgas . . . Chemie 24 Jahrgang (1971) pp. 473–477, 525–529, 578–586.
Klaus-Dirk Henning et al., "Aktivekohle-Verfahren zur Schwefelwasserstoff-Enternung", VDI Verlag GmbH 4 Dusseldorf 1, ISSN 0042-174 X, Nr.615/1983, pp. 2 7 10–29.

Primary Examiner—Louis J. Casaregola
Attorney, Agent, or Firm—Herbert Dubno

[57] ABSTRACT

Pollutant emissions produced during gas turbine power generation with a fuel gas from coal gasification are reduced by initially cooling the fuel gas to a temperature above the dewpoint but between 200° and 400° C. to condense alkalies on dust grains. In the fuel gas, HCl and HF are adsorbed on calcium carbonate and filtration removes the particulates. The fuel gas is reacted with oxygen in the presence of a carbon containing adsrobent to eliminate sulfur, and the flue gas after combustion is catalytically treated with a carbon containing adsorbent to remove nitrogen and sulfur oxides.

10 Claims, 1 Drawing Sheet

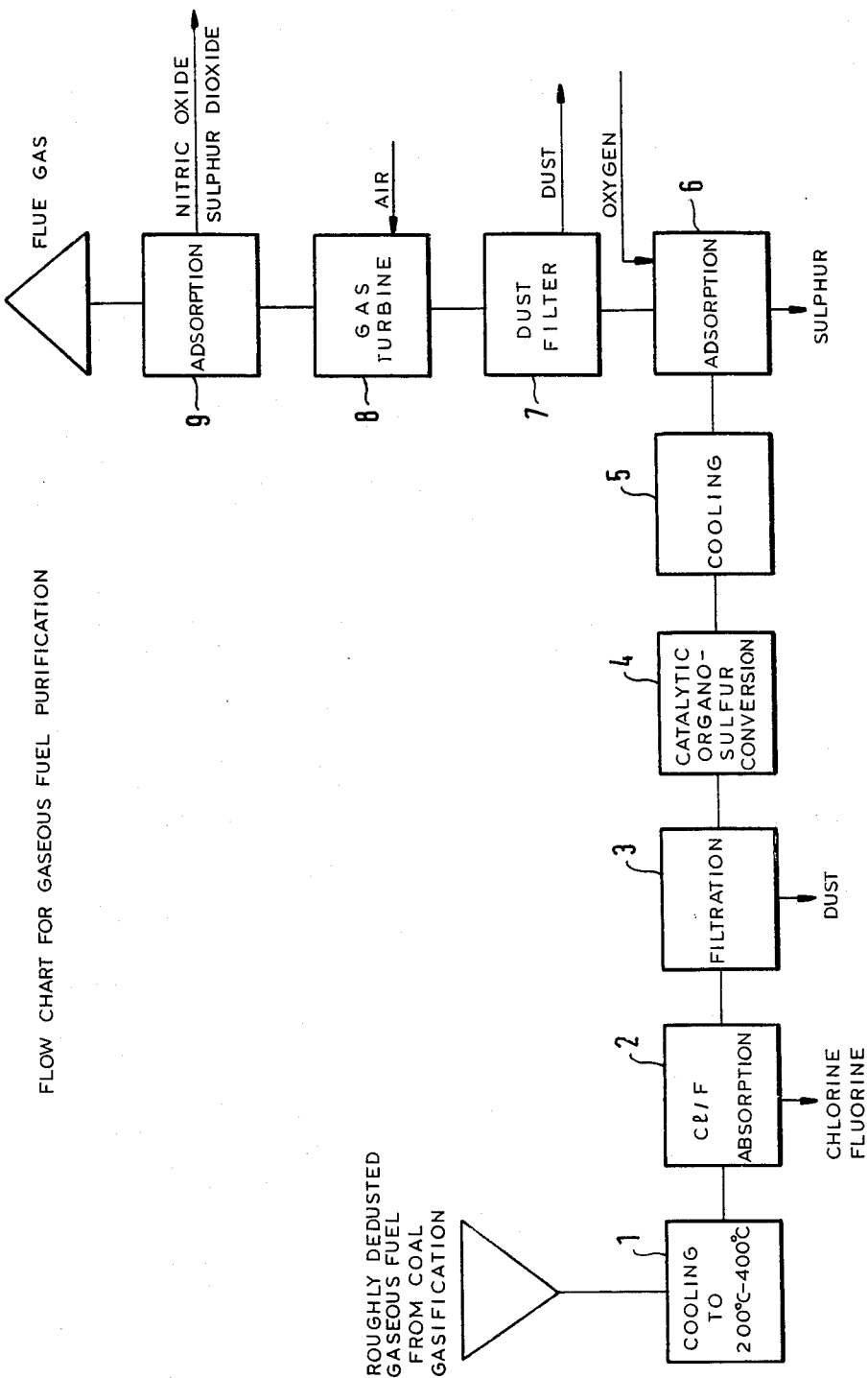
FLOW CHART FOR GASEOUS FUEL PURIFICATION

PROCESS FOR THE REDUCTION OF POLLUTANT EMISSIONS FROM POWER STATIONS WITH COMBINED GAS/STEAM TURBINE PROCESSES WITH PRECEDING COAL GASIFICATION

FIELD OF THE INVENTION

The present invention relates to a process for the reduction of the pollutant emissions produced during hardcoal-based electricity generation in power stations with combined gas turbine steam turbine processes using coal gasification in which the crude gaseous fuel is purified and the purified gas burnt in the gas turbine combustion chamber.

BACKGROUND OF THE INVENTION

From transactions of the ASME, Vol. 107, October 1985, p. 856–860 and Verfahrenstechnik 1-2 (1985), p. 18–21, processes are known in which pollutants like sulphur compounds, in particular hydrogen sulphide, as well as hydrogen chloride and hydrogen fluoride, are removed from the crude gaseous fuel after the gasification step in a wet scrubber while dust is removed in the electric precipitator. A disadvantage of the wet scrubbing process is the fact that the crude gaseous fuel is cooled down and waste waters are produced, which are problematic can contribute to environmental pollution.

As purification at higher temperatures improves the economy of the combined process, methods for hot gas purification have already been suggested. An insufficient cooling of the gaseous fuel may, however, cause difficulties in the gas turbine due to presence of vaporized alkalies, Powder Technology 40 (1984), p. 81–111. It is true that proposals for the separation of sodium and potassium at higher temperatures have already been worked out, but these processes complicate the entire process.

Moreover, purification at extremely high temperatures requires a separation of the hydrogen sulphide with sorbents, in particular lime. The regeneration problems in this context have not yet been solved, as can be appreciated from Report number ICTIS/TR03, IEA Coal Research, London 1979, chapter 2. A deposition of these products would create new environmental problems.

OBJECT OF THE INVENTION

The object of the invention is to avoid the disadvantages of the wet scrubbing process and the known hot gas processes and to provide a process which on the one hand reduces the temperature of the gaseous fuel to such an extent that the problems with the various pollutants contained in the gaseous fuel are avoided, and on the other hand, however, operates above the water vapor dewpoint so that there are no vapourization heat losses and also no polluting waste water.

SUMMARY OF THE INVENTION

This object is achieved in a process for the reduction of the pollutant emissions produced during hard coal-based electricity generation in power stations with combined gas/stream turbine processes with preceding coal gasification in which the crude gaseous fuel is purified and the purified gas burnt in the gas turbine combustion chamber.

According to the invention the hot crude gaseous fuel from the coal gasifier is cooled down in a heat exchanger to a temperature between approx. 200° C. and 400° C. ranging above the dewpoint and alkalies are condensed at the dust grains, is led through an absorption reactor filled with the calcium carbonate-containing material, e.g. limestone or dolomite chemically bonding hydrogen chloride and fluoride, is dedusted by means of a filter with a postdehalogenation being carried out in the filter bed which is built up in the filter, is led through an adsorption reactor filled with a carbon-containing adsorbent, and the sulphur contained in the hydrogen sulphide is converted to its elemental form in the presence of an oxygen supply and retained in the pores of the adsorbent, the purified gaseous fuel is burnt in the gas turbine combustion chamber under air supply, and the produced flue gas is freed from $NO_x$ as well as sulphur oxides, if required, in another adsorption reactor filled with a carbon-containing adsorbent as catalyst.

Advantageously the crude gaseous fuel is dedusted prior to colling (step a), a slotted metal filter cartridge is used for filtration (step c), and organic sulphur compounds contained in the gaseous fuel like COS, $CS_2$ and $CH_3SH$ are catalytically converted to hydrogen sulphide in a reactor filled with transition metal oxides as catalyst.

The gaseous fuel can be cooled down further in a second heat exchanger prior to desulphurization (step d) without having its temperature falling below the water vapor dewpoint.

The gaseous fuel can be fed to a slotted metal filter cartridge prior to desulphurization (step d) and the dust is removed except for residual dust contents of 5 to 10 $mg/m^3$.

The reactors can be fixed bed reactors, migrating bed reactors, fluidized bed reactors with dense or expanded fluidized beds or entrained flow reactors.

The material discharged from the reactors can be recirculated, and a regeneration unit can be assigned to the adsorption reactors.

This process chain separating pollutants in a temperature range between approximately 80° C. and 400° C. surprisingly guarantees an optimal removal of the pollutants contained in the gaseous fuel like dusts, alkalies, halogens, sulphur compounds and nitric oxides without creating new environmental problems by the suggested measures. By harmonizing the sequence of the individual process steps and by assigning the most effective temperature ranges to each step the individual effects of the individual measures, which are already known, are intensified or characteristic disadvantages are avoided respectively.

After utilizing the purified gas in a gas turbine the remaining residual heat is used to produce vapor which in turn is used to generate electric energy using a steam turbo set so that this technique does not only achieve a considerable reduction of emissions, but also a reduction of the costs for electricity generation.

BRIEF DESCRIPTION OF THE DRAWING

The sole FIGURE of the drawing is a flow chart illustrating the invention.

SPECIFIC DESCRIPTION

First, the gaseous fuel coming from the gasifier with a temperature of approx. 800° C. which was pre-dedusted in some cases is cooled down to approx. 200° C. to 400° C. by heat exchange with the purified gaseous fuel or the combustion air of the gas turbine. During this step the vaporized alkalies contained in the gas condense on the dust grains and are removed together with them.

The lower temperature limit depends on the total pressure of the gaseous fuel and the partial pressure of the water vapour in the gaseous fuel. At a total pressure 25 bar the water vapor partial pressure of the gaseous fuel from gasifier I listed below in Table 1 for example amounts to 4.325 bar corresponding to a saturation temperature of approx. 150° C. At a total pressure of 26 bar the water vapor partial pressure of the gaseous fuel from gasifier II (Table 1) amounts to 0.5 bar corresponding to a saturation temperature of 81° C. So each gaseous fuel may be cooled down to these temperatures without falling below the dewpoint.

Then hydrogen chloride and fluoride are selectively removed in an adsorption reactor containing limestone or other Ca-containing minerals like dolomite. Preferably a reactor is used which guarantees a good purification effect and thus a high load of the adsorbent due to a good material exchange and a sufficient contact time, for example a fluidized bed reactor or an entrained flow reactor. This reduces the discharge requirements.

Since the reaction velocity between the hydrogen halides and the limestone increases with the temperature it is required in the sense of an optimum process sequence to choose a temperature which is not too low. In this context it has, however, to be considered that the upper temperature limit should not exceed approx. 400° C. in order to avoid the reaction of hydrogen sulphide with limestone which only takes place noticeably at higher temperatures.

Besides the residual ash from gasification, the gas produced in this step contains additional entrained limestone-containing particles which are removed by a filter, preferably a metallic edge candle filter. Moreover, an additional post-dehalogenation takes place in the lime-containing filter bed which is built up in the filter.

A slotted metal filter cartridge is adapted to the particular conditions of hot gas operation. It operates according to the bed filtration principle, i.e. the separated material also constitutes the filter bed. The filter has a high separation rate up to residual dust contents of 5 to 10 mg/m³. compared to fabric filters the slotted metal filter cartridge is more reliable and easier to clean. In cleaned state, the pressure loss does not increase with increasing operating time due to clogging of the slots. Moreover, it has a long lifetime.

Now organic sulphur compounds like COS, $CS_2$ and $CH_3SH$ contained in the gaseous fuel may be catalytically converted to $H_2S$ with the water vapour present in the gaseous fuel by using transition metal oxides as catalysts in a reactor according to the reaction equations, e.g.

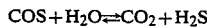

respectively

in an intermediate process step according to a known process (cf. e.g. H. Sommers, W. Last, Erdöl und Kohle, 24 (1971), 443 ff., 525 ff., 578 ff.).

After dust separation and, if required, conversion of the organic sulphur compounds the pre-purified gas may be cooled down, if required, in another heat exchanger to a sufficiently low temperature for the desulphurization step. In this context it has to be borne in mind that the temperature does not fall below the dew point of the water.

In the following process step the pre-purified gaseous fuel is led to an adsorption reactor filled with activated coal for $H_2S$ separation. By mixing an oxygen amount corresponding to the reaction stoichiometry (cf. example 1) to the gas stream elementary sulphur, which may be evaporated again in a regeneration step, deposits in the pores of the activated coal, as is known for example from VDI-Forschungsheft Nr. 615, VDI-Verlag, Düsseldorf 1983, p. 16 ff.

Compared to the residues of processes using lime, the production of elementary sulphur is above all more environmentally acceptable, but also more cost-efficient.

To protect the gas turbine blades from erosion by dust another gas purification step may be advisable in many cases. To this end slotted metal filter cartridges are particularly suitable because they can also be used for the reliable filtration of larger, particularly eroding particles.

The ammonia from coal gasification still contained in the gaseous fuels is partially converted to nitric oxides in the gas turbine combustion chamber and removed together with the nitric oxides thermally produced from the atmospheric nitrogen during combustion in another purification step. This process is known from Glückauf 121 (1985), p. 1561–1566. The reactions taking place are mentioned in the following example 1.

According to the flow chart the gaseous fuel from coal gasification, if required is roughly dedusted, and is led to a heat exchanger 1 in which it is cooled down to 100° C. to 400° C. In this context it has to be borne in mind that the gas is not cooled below the dewpoint fallen below. An absorption reactor 2 is installed downstream of the heat exchanger 1 in which the halogens chlorine and fluorine are removed by chemical bonding to a lime-containing mineral. Subsequently, the gaseous fuel is dedusted in a filter 3, preferably by using a slotted metal filter cartridge, where additional dehalogenation takes place.

In another reactor 4 filled with a catalyst (transition metal oxide) organic sulphur compounds are converted to hydrogen sulphide.

In another heat exchanger 5 a further cooling of the gaseous fuel may be done, again bearing in mind that gas temperature should not fall below the dewpoint of the water vapour fallen. In the downstream adsorption reactor 6 filled with activated coal, elementary sulphur is removed under oxygen supply. As known, the sulfur is recoverable in pure form by destillation in a regeneration unit which is not shown here. In another dust filter 7, preferably also in form of a slotted metal filter cartridge, the remaining dust is almost totally removed. Then, the gaseous fuel is fed to a gas turbine 8 where it is burnt under air supply.

The flue gas from the gas turbine is led to another adsorption reactor 9 filled with activated coal in which the catalytic nitric oxide removal under $NH_3$ supply is effected. At the same time residual sulphur dioxide is separated. A regeneration reactor for the regeneration of the activated coal may be installed downstream of the adsorption reactor 9.

The flue gas released into the atmosphere is almost free of pollutants.

SPECIFIC DESCRIPTION

Example 1

The roughly pre-dedusted gaseous fuel from a pressurized coal gasification plant (gasifier I) had a temperature of 800° C. and a pressure of 25 bar and had a composition as shown in Table 1. The gas had a dust load of 310 mg/m³ STP.

TABLE I

| gas components | | gasifier I | gasifier II |
|---|---|---|---|
| CO | % by vol. | 41.4 | 59.6 |
| $H_2$ | % by vol. | 28.1 | 29.0 |
| $CO_2$ | % by vol. | 12.4 | 2.3 |
| $H_2O$ | % by vol. | 17.3 | 2.94 |
| $H_2S$ | % by vol. | 0.25 | 1.23 |
| $N_2$ | % by vol. | 0.41 | 4.8 |
| $CH_4$ | % by vol. | 0.06 | 0.01 |
| HCl | % by vol. | 0.05 | 0.056 |
| HF | % by vol. | 0.003 | 0.004 |
| $NH_3$ | % by vol. | 0.024 | 0.015 |
| COS | % by vol. | 0.008 | 0.04 |

The gas was led through a heat exchanger 1 in which a part of the combustion air was heated for the gas turbine combustion chamber. The gaseous fuel was cooled down to 350° C. while the combustion air was pre-heated to 380° C. During cooling down alkalies existing in trace amounts in the fuel gas. condensed at the surface of entrained dust particles.

Then, the gas was led into a fluidized bed reactor 2 containing a fine-grained limestone to remove hydrogen fluoride and chloride. These hydrogen fluoride was removed to the detectability limit, hydrogen chloride to a residual content of approx. 90 ppm according to the following reaction equations:

$$CaCO_3 + 2HF \rightleftharpoons CaF_2 + H_2O + CO_2$$

$$CaCO_3 + 2HCl \rightleftharpoons CaCl_2 + H_2O + CO_2$$

The fluidized bed was operated in an expanded state with recirculation of the fine-grained limestone. The material withdrawn from the circuit, which was replaced by new limestone, had converted to 70% with the halogenides The gas from the fluidized bed reactor 2 was then led through a filter 3 to remove both the entrained dust from the gasification plant and from the dehalogenation unit. In the presented case a slotted metal filter cartridge was used for this purpose. It operates according to the bed filtration principle. As the separated dust contained some limestome from the dehalogenation unit a post-reaction took place in the filter bed reducing the hydrogen chloride content to a level of 80 ppm.

After dust separation the gaseous fuel still had a temperature of 300° C. With this temperature it directly entered into a catalyst-filled reactor 4 for the conversion of $CS_2$ and the other organic sulphur compounds contained in the gaseous fuel to $H_2S$.

Then the gas was cooled down in a second heat exchanger 5 to 160° C. for $H_2S$ separation with the water vapor dew point not being fallen below. To cool the gas a part of the combustion air was pre-heated countercurrently to 250° C.

The $H_2S$ was removed according to the reaction equation $$2\ H_2S + O_2 \xrightarrow{activated\ coal} \tfrac{1}{4} S_8 + 2\ H_2O$$

after admixture of 0.2% by volume oxygen under conversion to elementary sulphur in a fixed bed reactor 6, which was filled with the granular carbon-containing material (activated coal) removing 95% of the hydrogen sulphide. After complete loading of the adsorbent the gas stream was switched over to a second identical reactor 6 whilst the separated sulphur was removed from the first reactor 6 by destillation for regeneration.

To protect the gas turbine blades from dust particle erosion the purified gaseous fuel was finally led through another slotted metal filter cartridge in which particularly the particles > 10 μm were separated completely prior to its combustion in the gas turbine combustion chamber 8. The dust content of the gaseous fuel fed to the gas turbine combustion chamber averages about 10 mg/m³.

The gas was burnt in a gas turbine combustion chamber 8 under a supply of combustion air. The flue gases were led to a gas turbine and a waste heat boiler. In the flue gas purification system downstream of the combustion chamber 8 the nitric oxides which were formed from the ammonia content of the gaseous fuel and from the atmospheric oxygen, were decomposed in a fixed bed reactor containing a granular carbon-containing material 9 after adding a corresponding amount of ammonia at 120° C. according to the reaction equation $$6NO_x + 4xNH_3 \rightarrow (3+2x)N_2 + 6xH_2O$$

(x=1.2).

The flue gas released into the atmosphere still contained the following amounts of pollutants:

TABLE 2

| | |
|---|---|
| $SO_2$ | 125 mg/m³ |
| $NO_x$ | 110 mg/m³ |
| HCl | 45 mg/m³ |
| dust | 3 mg/m³ |

Example 2

From another pressurized coal gasification plant with dry coal feed operating according to the entrained flow principle pre-dedusted gaseous fuel was released with a temperature of 350° C., a pressure of 26 bar and a dust load of 280 mg/m³. The gas was cooled down to 120° C. in a heat exchanger 1 and passed through a fluidized bed reactor containing a fine-grained limestone 2 for hydrogen fluoride and chloride removal. The gas was composed as shown in the third column of Table 1 (gasifier II). The alkalies existing in traces have almost completely condensed during cooling on the dust particles and were separated together with them.

In the limestone adsorber 2, which was operated as in example 1 in the state of an expanding fluidized bed with solid circulation, the hydrogen fluoride could be reduced to the detectability limit, and the hydrogen cloride to a residual content of approx. 30 ppm. This low residual content is attainable in this case because the partial pressures of the water vapour and of the carbon dioxide in the gaseous fuel of gasifier II were considerably lower compared to the gaseous fuel from gasifier I. The limestone conversion with the halogenides amounted to 75%.

After dedusting the gaseous fuel, which took place as in example 1 by means of a slotted metal filter cartridge 3, 99% of the hydrogen sulphide as well as 60% of the other organic sulphur compounds were removed in the activated coal adsorber 5, which contained an activated coal in this case adsorbing preferably also other sulphur components besides H₂S without a further cooling being required.

The other gas purification steps took place in analogy to those in example 1.

The flue gas released to the atmosphere still contained the following amounts of pollutants:

TABLE 3

| | |
|---|---|
| SO$_2$ | 250 mg/m$^3$ |
| NO$_x$ | 90 mg/m$^3$ |
| HCl | 10 mg/m$^3$ |
| dust | 5 mg/m$^3$ |

We claim:

1. A process for reducing pollutant emissions produced during hard-coal-based electricity generation in power stations with combaned gas-turbine/steam-turbine operation and in which a fuel gas is produced by coal gasification, said process comprising the steps of:
   (a) cooling said fuel gas containing hydrogen sulfide, hydrogen chloride, hydrogen fluoride and alkalies in a vapor state and entrained dust grains to a temperature between approximately 200° and 400° C. and above the water-vapor dewpoint of the fuel gas to condense said alkalies on said dust grains and produce a cooled fuel gas;
   (b) reacting said cooled fuel gas with an adsorbent containing calcium carbonate to chemically bond hydrogen chloride and hydrogen fluoride from said fuel gas to said adsorbent;
   (c) thereafter filtering said adsorbent from said cooled fuel gas and dedusting same by passing said fuel gas through a filter to cause build up of a filter bed from particles carried by said fuel gas, and effecting a postdehalogenation subsequent to step (b) on the filter bed as said filter bed is built up on said filter;
   (d) reacting said fuel gas following step (c) with a carbon-containing adsorbent in the presence of oxygen to transform hydrogen sulfide in said fuel gas to elemental sulfur and trap said elemental sulfur in pores of said carbon-containing adsorbent to produce a purified gaseous fuel;
   (e) burning said purified gaseous fuel in a gas-turbine combustion chamber to which air is supplied to produce a flue gas containing nitrogen oxides and sulfur dioxide; and
   (f) treating said flue gas with a catalytically active carbon-containing adsorbent to remove said oxides from said flue gas.

2. The process defined in claim 1, further comprising the step of dedusting the fuel gas subsequent to coal gasification and prior to step (a).

3. The process defined in claim 1 wherein said adsorbent from step (b) is filtered from the cooled fuel gas in step (c) by passing the fuel gas through a slotted-metal filter cartridge.

4. The process defined in claim 1 wherein, prior to step (d) organic sulfur compounds selected from the group which consists of COS, CS$_2$ and CH$_3$SH are catalytically converted to hydrogen sulfide on transition metal oxide catalyst.

5. The process defined in claim 1 wherein, prior to step (d) and subsequent to step (a), the fuel gas is cooled further without permitting its temperature to fall below the water vapor dewpoint of the flue gas.

6. The process defined in claim 1 further comprising the step, prior to step (d) of filtering the fuel gas to remove dust in amounts in the fuel gas above a residual dust content of 5 to 10 mg/m$^3$.

7. The process defined in claim 6 wherein at least one of steps (b), (d) and (f) is carried out in a fixed bed reactor.

8. The process defined in claim 1 wherein at least one of steps (b), (d) and (f) is carried out in a fluidized bed reactor.

9. The process defined in claim 1 in which at least one of steps (b), (d) and (f) is carried out in a reactor from which an adsorbent is removed and to which the removed adsorbent is recirculated.

10. The process defined in claim 1 wherein at least one of steps (b), (d) and (f) is carried out in a reactor from which an adsorbent is removed and regenerated.

* * * * *